United States Patent [19]

Kobayashi et al.

[11] Patent Number: 4,707,270
[45] Date of Patent: Nov. 17, 1987

[54] PROCESS FOR TREATING WASTE WATER CONTAINING PHOSPHORUS COMPOUNDS AND/OR ORGANIC COD SUBSTANCES

[75] Inventors: Waichi Kobayashi; Koji Usui; Kozo Hirosawa; Tetsuya Sadatani, all of Ube, Japan

[73] Assignee: Ube Industries, Ltd., Yamaguchi, Japan

[21] Appl. No.: 824,906

[22] Filed: Jan. 31, 1986

[30] Foreign Application Priority Data

Jan. 31, 1985 [JP] Japan .................................. 60-15366
May 17, 1985 [JP] Japan ................................ 60-103678
Dec. 27, 1985 [JP] Japan ................................ 60-292819

[51] Int. Cl.$^4$ .............................................. B01D 15/00
[52] U.S. Cl. .................................... 210/683; 210/691; 210/716; 210/723; 210/906
[58] Field of Search .............. 210/702, 716, 717, 723, 210/726, 906, 907, 683, 691; 252/175; 106/100

[56] References Cited

U.S. PATENT DOCUMENTS

4,301,014 11/1981 Buckholtz et al. ................... 210/906
4,395,357 7/1983 Krämer et al. ....................... 210/691
4,402,833 9/1983 Bennett et al. ....................... 210/906

FOREIGN PATENT DOCUMENTS

53-082052 7/1978 Japan .................................. 210/906
56-7680 1/1981 Japan .
56-7681 1/1981 Japan .
56-15885 2/1981 Japan .
56-15886 2/1981 Japan .

OTHER PUBLICATIONS

Encyclopedia of Chemical Technology, 3rd edition, vol. 5, John Wiley & Sons, N.Y., 1979, pp. 180–193.
Vinyard, D. L., "High-Calcium Fly Ash for Tertiary Phosphorous Removal", *Water and Sewage Works*, Jun. 1979, pp. 62–64 and 104.

*Primary Examiner*—Richard V. Fisher
*Assistant Examiner*—Jeffrey W. Peterson
*Attorney, Agent, or Firm*—Flynn, Thiel, Boutell & Tanis

[57] ABSTRACT

The specification discloses a novel calcium silicate water-treating agent exhibiting a superior ability to remove various kinds of phosphorus compounds or other environmental pollutants contained in wastewater, the calcium silicate water treating agent comprising a burned product which is prepared by burning a mixture containing as main constituents calcium compound, thermally decomposable to calcium oxide (CaO), and $SiO_2$-containing compound at a temperature of 1300° to 1600° C., the molar ratio of $CaO/SiO_2$ of the resultant burned product being in the range of 1.5 to 5.0, preferably 2.0 to 4.0. In this water treating agent, $SiO_2$ component may be partially replaced by $Al_2O_3$ and/or $Fe_2O_3$. A further water treating agent is prepared by heating the hydrate of the burned product prepared above at a temperature of 50° to 700° C. By using the thus obtained water treating agents, water treatment can be carried out with a high efficiency, thereby the treatment time, labor and cost can be considerably saved.

25 Claims, No Drawings

PROCESS FOR TREATING WASTE WATER CONTAINING PHOSPHORUS COMPOUNDS AND/OR ORGANIC COD SUBSTANCES

BACKGROUND OF THE INVENTION

The present invention relates to a novel calcium silicate water-treating agent useful in the treatment of industrial water or wastewater, boiler water, or other foul water containing sewage, feces, etc. and more particularly, to a calcium silicate water-treating agent capable of removing phosphorus compounds, such as phosphates and oxidisable pollutants which are measured in the determination of chemical oxygen demand (hereinafter such "oxidisable pollutants are referred to as "COD components".) from the water with a high efficiency, by a simple process that can be readily adapted to practical use.

The present invention further relates to a process for the water treatment with the novel water treating agent.

In recent years, environmental conservation and preservation of water have become increasingly a very important social problem and a higher level of technique and a more expanded utility have been progressively required in water treatment. In general, various sewages, foul water, industrial water or waste water, boiler water or the like contains inorganic phosphates, such as orthophosphoric acid or condensed phosphates in various forms, and, when water containing such phosphates is drained in nature, the phosphates considerably accelerate eutrophication in closed or stagnant water areas, such as lakes, marsh or inland sea, thereby causing serious problems.

Under such circumstances, there have heretofore been proposed various methods for treating various kinds of industrial wastewater, sewage and other foul water containing feces or other environmental pollutants and some of them have been practically used. For example, coagulation-sedimentation methods using lime or metallic salts such as aluminum salt, iron salt, or magnesium salt as a coagulating agent or precipitant; activated carbon adsorption; and activated sludge process are disclosed in the general introduction descriptions of Environmental Engineering, Volume 11, No. 11, pages 826, 834, 836 and 841 (1982), published by Environmental Conservation Engineering Association in Japan and in The Technology And Regulation of Pollution Control (Water Quality), pages 124, 128 and 187, published by Industrial Pollution Control Association on June 15, 1983 in Japan.

However, unfortunately, these known methods are not satisfactory as water treating methods because their ability to remove pollutants, especially phosphorus compounds and COD components, contained in waste water, is too low for practical use, and a great amount of treating agent is needed, thereby resulting a large amount of slurry and causing an increase in treatment time and cost. Further, sludge formed during the process of water treatment can not be readily precipitated by these prior art techniques and great care should be taken to handle treating agents. Further, these conventional methods have great difficulties in handling the sludge separated from water after treatment. In these treating methods, used water-treating agent is separated as sludge containing pollutants from water after treating. However, since in this separation operation, water adsorbed into the sludge can not be easily removed, great difficulties are experienced in the after-treating. For example, when the sludge is after-treated by incineration, much treatment cost is required. Alternatively, if the sludge is dumped, very strict limitations are imposed on the place where dumping occurs, since secondary pollution problems may be created.

SUMMARY OF THE INVENTION

It is therefore a primary object of the present invention to provide water treating agents exhibiting a superior pollutant removability and thereby eliminating the foregoing problems encountered in the conventional methods set forth above.

Another object of this invention is to provide a beneficial process for treating waste water wherein pollutants, especially phosphates and COD components, are easily removed with a high efficiency, using certain specified treating agents.

The present inventors have made many studies to overcome the foregoing problems and, as a result, found that certain calcium silicates specified below function very effectively as a water treating agent in removing pollutants contained in waste water and more especially for removing phosphorus compounds which have recently been discussed as pollutants eutrophicating water. This invention was reached on the basis of such finding.

According to the present invention, there is provided a calcium silicate water-treating agent which comprises a burned product prepared by burning a mixture containing as main constituents calcium compound, which is thermally decomposed to yield calcium oxide (CaO), and $SiO_2$-containing compound at a temperature of 1300° to 1600° C., the molar ratio of $CaO/SiO_2$ of the resultant burned product being in the range of 1.5 to 5.0, preferably 2.0 to 4.0. In the water treating agent, $SiO_2$ component may be partially replaced by $Al_2O_3$ and/or $Fe_2O_3$. Also, according to a second feature of the present invention, there is obtained another water treating agent which is produced by hydrating the above burned product containing calcium silicates as main components and thermally treating the hydrated calcium silicates at a temperature of 50° to 700° C.

A further feature of the present invention is directed to a process for the water treatment using these two types of water treating agents. In the treatment, these water treating agents are preferably divided into parts, preferably 2 to 4 parts, and these respective parts are added separately to water. Such separate addition of the invention water treating agent is very advantageous in industrial applications as compared with the case where it is added at a time to water to be treated. The treating agents of the present invention are particularly effective to remove phosphorus compounds and COD components.

DETAILED DESCRIPTION OF THE PREFERRED EMBODIMENTS

The present invention will now be set forth hereinafter in detail referring to the preferred embodiments of the preparation of calcium silicate water-treating agents according to the present invention.

First, calcium oxide or precursors thereof, such as calcium carbonate, calcium hydroxide or gypsum which are thermally decomposable to yield calcium oxide (CaO) and high $SiO_2$ content compounds, for example silica sand, are used in powder form as main material-constituting components. The powders of these starting materials are uniformly mixed and then burned at a temperature of 1300° to 1600° C., preferably at a temperature of 1400° to 1500° C. The burning time of 30 to 60 minutes is sufficient for this burning. Prior to burning, the starting material composition should be so adjusted that the molar ratio of CaO to $SiO_2$ in the resulting burned product may fall within the range of 1.5 to 5.0 and preferably 2.0 to 4.0.

The $CaO/SiO_2$ molar ratio of less than 1.5 lowers an ability to remove pollutants. On the other hand, the molar ratio higher than 5.0 not only lowers an ability to remove pollutants but also retards the precipitation of the resulting sludge. Therefore the molar ratio outside the specified range is unfavorable.

As previously described, $SiO_2$ may be partially replaced with $Al_2O_3$ and/or $Fe_2O_3$ and in such a case, the firability of the material can be improved without impairing its pollutant removability. For this replacement, relatively low $SiO_2$ concentration material sources, such as blast furnace slag, clay or fly ash can be wholly or partially used in place of the high $SiO_2$ content compounds.

The burned product thus obtained contains calcium silicates, for example $Ca_3SiO_5$ and $Ca_2SiO_4$, as main components, and further other calcium compounds such as $Al_2Ca_3O_6$, $Al_2Ca_4Fe_2O_{10}$, etc. may be contained. The composition of the burned product is determined by constituents used in the starting material-constituting components and the mixing proportion thereof. For actual use, the burned product is preferably finely ground to a powder form of not more than 0.149 mm and, if desired, is further granulated into a size of not more than 5.0 mm.

In addition to the invention water treating agent, the following halides may be also used either singly or in combination of two or more thereof. Namely, at least one selected from the group consisting potassium fluoride, sodium fluoride, potassium chloride, sodium chloride, magnesium chloride, calcium chloride, barium chloride, potassium bromide, sodium bromide, calcium bromide, barium bromide, calcium iodide, and other water-soluble halides of alkali metals or alkaline earth metals. These additives can provide a further beneficial effect in removing pollutants contained in waste water and improves the settleability of the water treating agent.

Although the burned product can be, as mentioned above, used as a water treating agent without any further treatment, preferably the burned product is hydrated in order to increase the specific surface area. Consequently, such hydrated product provides better adsorptive activity than that of the burned product. In order to obtain such hydrated product, the burned product is mixed with water preferably in an amount of 1 to 7 times by weight the amount of the burned product, and then is hydrated. After removing water, there is obtainable a substance containing hydrated calcium silicate as main component. In order to obtain the best effect in achieving the objects of the present invention, the content of the hydrated calcium silicate in this hydrated substance is preferably controlled to the range of not less than 50 weight percent, more preferably not less than 70 weight percent. In general, the invention burned product is fully hydrated at 15° to 70° C. for at least 30 minutes.

After the hydration, the hydrated substance containing calcium silicate hydrates as main components is separated from water and is aged by heating at a temperature of 50° to 700° C., preferably 70° to 600° C. to remove adsorbed water therefrom and thereby to give a calcium silicate base hydrate essentially free of adsorbed water. The time consumed for this heating is usually 3 hours or longer, although it may be varied by the temperature of this aging.

If the heating temperature is lower than 50° C., water adsorbed in the calcium silicate hydrate is scarcely removed unless this heating process is carried out under vacuum, or a very long time is consumed for the dewatering. Thus, such low heating temperature is industrially impracticable. Heating temperatures higher than 700° C. will greatly reduce the phosphate and COD component removing ability of the resulting water agent.

As an example, in the examination by X-ray diffractometry of the hydrated product (molar ratio of $CaO/SiO_2=3.0$) which was burned at 1500° C. for one hour, hydrated and then was heated at 300° C., only vague broad diffraction spectra are observed except for a clear diffraction spectrum ascribed to $Ca(OH)_2$. Further, according to the result of differential thermal analysis, the content of $Ca(OH)_2$ was found to be 18%. From such experimental data, it is concluded that the above invention calcium silicate water-treating agent is mainly constituted of amorphous substances. However, even if besides the amorphous calcium silicate hydrate substances, crystalline calcium silicate or other crystalline substances are included in the invention water treating agents, the properties of the agents are not adversely affected in the treatment of various types of industrial waste water and sewage or the like except that a larger amount of the treating agent is needed.

Also, in the above invention hydrated calcium silicate water-treating agent, $SiO_2$ can be partially replaced with $Al_2O_3$ and/or $Fe_2O_3$. Such treating agents can be produced similarly as described above, using fly ash, blast furnace slag in a starting material and the prepared agent exhibits the same excellent properties as the treating agents that do not contain $Al_2O_3$ and/or $Fe_2O_3$.

In practice of the water treatment, the invention calcium silicate water-treating agent set forth above, is added to water containing pollutants so that the pollutants may be adsorbed onto the surface of the treating agent. After adsorption reaction, the agent is taken out of the treatment system.

Since the calcium silicate water-treating agent of the present invention is used in a finely ground solid form, the reaction between phosphates and COD components to be removed and the water-treating agent proceeds as an adsorption reaction on the surface of the agent. The reaction rate is increased with an increase in the initial concentration of pollutants and when the initial concentration of pollutants is low, the rate will become slow. However, when the surface of the agent is covered with phosphates or other pollutants to a certain extent, the adsorption reaction is retarded. Therefore, even if the total quantity of the agent required for the water treatment is added at one time, the adsorption reaction rate is decreased with treatment time. In order to minimize this unfavorable phenomenon, it is more preferable to add the treating agent in divided parts, rather than to add it at one time to the water to be treated and thereby the overall reaction rate can be increased and the treating equipment can be small-sized. Further, an amount of the agent required for the treatment can be saved, thereby reducing greatly the formation of sludge and facilitating the treatment operation.

The way of practicing such divided addition will be determined by the ability to remove phosphate or COD components and the removing rate.

In the divided addition, although the invention water treating agent of calcium silicate may be taken out of the water before the next addition, such a plurality of troublesome operations are not necessarily needed. After the completion of the water treatment, all the agent added can be conveniently removed at once.

The higher the number of divided parts, the higher will be the removing effect of the invention water treating agent. In other words, three parts is more effective than two parts and four parts is more effective than three parts. However, when the number of parts exceeds a certain value, the treatment operation is complicated and the treatment time becomes longer, but the obtained effect is only slight. Therefore, in practical industrial applications, the agent is divided into from two to four parts. By such divided addition, the water treating agent of the present invention exhibits a powerful pollutant removability, particularly as to phosphates, and makes easy the separation of the resulting sludge, in comparison with lump sum addition. Further, the divided addition reduces the formation of sludge and provides a much higher treatment efficiency thereby rendering the invention treatment more convenient for industrial utility.

As described above, the unhydrated or hydrated water treating agents of the present invention exhibit an unexpectedly considerable removing ability for the pollutants contained in waste water, especially phosphorus compounds, such as orthophosphoric acid, pyrophosphoric acid, metaphosphoric acid or phosphates thereof or tripolyphosphate, and COD components which can not be easily removed by any of the conventional adsorption methods using activated carbon, metal salts or other known adsorbents or activated sludge process, etc. and thereby the treatment efficiency is greatly increased. Although the mechanism of such advantageous function and effect is not fully understood, it can be assumed that, when the invention calcium silicate agent is added to water to be treated, the water is made alkaline or more alkaline regardless of its condition, i. e., acidic, neutral or alkaline, and water-insoluble phosphates are formed during the process of treating under alkaline conditions and formed phosphates are easily coprecipitated with the treating agent of the present invention. Another possible assumption is that anions formed by dissociation of various kinds of phosphorus compounds and COD components under alkaline condition are adsorbed on the surface of the treating agent by the high adsorptive activity of the agent.

The calcium silicate type water treating agents of the present invention exhibit a very considerable ability to remove pollutants, especially phosphorus containing matters and COD components, contained in various wastewaters. Further, since the invention water treating agent can expedite the precipitation and dewatering of the resulting sludge and reduces the formation of sludge, water treatment can be readily performed with a high efficiency.

In practicing the water treatment, the invention treating agents are used either in a powder form of a size not larger than 0.149 mm or in a granulated form of a size not larger than 5.0 mm and the treatment operation may be carried out either in a batch process or in a continuous process.

For example, when industrial wastewater is treated with the invention treating agent in the powder form, the powdered agent is directly added to the wastewater to be treated and stirred to cause them to contact with the wastewater for a certain period, thereby causing adsorption of pollutants thereon and then coprecipitating.

Although the water treating agent can be added at one time, more advantageously the total amount of the water treating agent to be added is divided into two to four parts and each part is added separately to the water. When the treatment is conducted in a batch process in which water to be treated is contained in the same vessel, the first part of the agent is added to the water, allowed to stand in contact with pollutants for a certain period to cause the pollutants to be adsorbed thereon. Thereafter, the second part is added and the same procedure is repeated. As to the third part and four part, the same procedure is repeated and the added water treating agent adsorbing pollutants is removed from the water. Alternatively, in a continuous process in which water is contained in a plurality of vessels linked in series, the divided parts are each continuously added to the different vessels and allowed to contact with pollutants for a period of time sufficient for adsorption of the pollutants. Then, the resulting solid matter is separated from the treated water discharged from the last vessel.

The precipitates thus formed can be readily separated from the treated waste water. The treating time and the required amount of the treating agent are appropriately adjusted depending on the type and the concentration of pollutants to be removed and the desired extent to which pollutants are removed. Thereafter, in a usual manner the resulting slurry containing the water treating agent adsorbing the pollutants therein is subjected to condensation and dewatering operations and removed together with the used treating agent.

When the invention treating agent is used in a granular form, the granules are conveniently filled in a column and wastewater to be treated is passed through the column. Of course, the water treating agent of this invention may be used in the same manner regardless of its form, namely, a powder form or a granular form. However, as in the case of granular form, the agent should be more fully stirred so that it can sufficiently contact with pollutants. Practically, the stirring speed should be higher than in the case of powder form so that the agent does not sink downwardly toward the bottom of the vessel before the pollutants are fully adsorbed on the agent.

Further, regardless of whether the water treating agent is of powder form or of granular form, it can be packed in a bag with smaller openings than the size of particles of the agent and hung in the water. When the agent is used in such fashion, the step of separation of the solid matter from water is omitted.

The advantages of the invention calcium silicate water-treating agent over quick lime, known in the prior art, include the following:

Quick lime is designated as a dangerous substance of class 3 under section 2 of the Fire Service Act in Japan and is rapidly slaked by moisture in the air with the evolution of heat because of its considerable hygroscopicity. Therefore, special care should be taken to store this hygroscopic substance. Further, when quick lime enters a person's eyes by mistake, eyesight may be lost. Besides such risk or problem in handling, there is a further disadvantage that when quick lime is used to treat wastewater, it is very difficult to separate the resulting sludge by precipitation.

The calcium silicate water-treating agent of the present invention is, in contrast, free from such danger which may be caused, for example, by the evolution of heat and is superior in storage stability because of its moderate hydration rate. Further, when the invention water treating agent is added to wastewater, the wastewater is brought to a high pH level of 10.3 or higher, although the pH value may vary depending on the addition amount. Therefore, ammonia component contained in the wastewater can be also removed in combination with ammonia stripping method, without adding any alkaline substances, for example, caustic soda or lime.

Hereinafter the present invention will now be described in detail with reference to the detailed examples.

EXAMPLE 1

80 parts by weight of calcium carbonate powder ($CaCO_3$ content: 98%) and 16.3 parts by weight of silica sand powder ($SiO_2$ content: 96%) were weighed, thoroughly mixed and then filtered in an electric furnace at 1500° C. for one hour to give a burned product containing $Ca_3SiO_5$ as a main constituting component. The burned product thus obtained was finely ground to a powder by using a test mill so as to pass through a 149 μm standard sieve.

Sodium tripolyphosphate (first-grade reagent by Wako Pure Chemical Industries, Ltd.) was dissolved in distilled water to prepare an aqueous solution containing phosphate at a concentration of 50 ppm as $PO_4^{3-}$.

0.03 g of the powdered water treating agent set forth above was added to 100 ml of this aqueous phosphate solution, stirred at 300 rpm with a magnetic stirrer at room temperature for 90 minutes, and filtered through a filter paper.

In order to examine the phosphate removing ability of this agent, the concentration of $PO_4^{3-}$ (residual $PO_4^{3-}$) remaining in the filtrate was measured using a spectrophotometer (Model 220 A by Hitachi, Ltd.), in accordance to the method for measuring the total phosphorus content (by means of decomposition of perchloric acid and nitric acid) specified in subsection 46. 3.1 of "Testing Methods for Industrial Wastewater" of Japanese Industrial Standard (JIS) K 0102 and $PO_4^{3-}$ removability (percentage of $PO_4^{3-}$ removed by water treating to the initial $PO_4^{3-}$) was calculated. The obtained result is shown in Table 1.

EXAMPLES 2 TO 4 AND COMPARATIVE EXAMPLES 1 AND 2

Further water treating agents were prepared in the samd procedures as described in Example 1 except that the mixing ratio of calcium carbonate powder to silica sand powder was varied as shown in Table 1 and the phosphate removing ability of each agent was examined in the same way as in Example 1. The results are given in Table 1.

TABLE 1

| No. | Mixing Ratio of Calcium Carbonate Powder/ Silica Sand Powder (by Weight) | Molar Ratio of CaO to $SiO_2$ of Burned Product | Residual $PO_4^{3-}$ (ppm) | $PO_4^{3-}$ Removability (%) |
| --- | --- | --- | --- | --- |
| Example | | | | |
| 1 | 80/16.3 | 3.0 | 8.3 | 83.4 |
| 2 | 80/32.7 | 1.5 | 14.7 | 70.6 |
| 3 | 80/24.5 | 2.0 | 13.3 | 73.4 |
| 4 | 80/12.3 | 4.0 | 12.9 | 74.2 |
| Comparative Example | | | | |
| 1 | 80/49 | 1.0 | 35.2 | 29.6 |
| 2 | 80/8.9 | 5.5 | 29.4 | 41.2 |

EXAMPLE 5

80 parts by weight of calcium carbonate powder ($CaCO_3$ content: 98%), 9 parts by weight of silica sand powder ($SiO_2$ content: 96%) and 11 parts by weight of fly ash containing, by weight, 55% $SiO_2$, 33% $Al_2O_3$, 4% $Fe_2O_3$ and 2% CaO were weighed, thoroughly mixed and then burned in an electric furnace at 1500° C. for one hour to give a burned product containing $Ca_3SiO_5$, $Ca_2SiO_4$, $Al_2Ca_3O_6$ and $Al_2Ca_4Fe_2O_{10}$ as main constituting components. The burned product thus obtained was finely ground by using a test mill until it was passed through a 149 μm standard sieve.

The thus finely ground agent was examined as to its phosphate removing ability in the same manner as described in Example 1 and the result is given in Table 2 below.

EXAMPLES 6 TO 9

The water treating agent prepared in Example 5 was further examined in the same manner as in example 1 except for varying 0.03 g of the agent added to the phosphate solution to 0.08 g (Example 6), 0.10 g (Example 7), 0.20 g (Example 8) and 0.30 g (Example 9) to observe the effect of the added amount upon the phosphate removability. The test data for this series is given together with the pH values of the respective filtrates in Table 2.

TABLE 2

| No. | Amount of Added Water Treating Agent (g) | pH of Filtrate | Residual $PO_4^{3-}$ (ppm) | $PO_4^{3-}$ Removability (%) |
| --- | --- | --- | --- | --- |
| Example | | | | |
| 5 | 0.03 | 10.3 | 7.7 | 84.6 |
| 6 | 0.08 | 10.5 | 4.5 | 91.0 |
| 7 | 0.10 | 10.7 | 1.7 | 96.6 |
| 8 | 0.20 | 11.0 | 0.8 | 98.4 |
| 9 | 0.30 | 11.5 | 0.5 | 99.0 |

EXAMPLES 10-12

Further testing was conducted in the same way as in Example 7 except that potassium primary phosphate $KH_2PO_4$ (Example 10), sodium primary phosphate $NaH_2PO_4$ (Example 11) and sodium hexametaphosphate $(NaPO_3)_6$ (Example 12) were used in place of sodium tripolyphosphate $Na_5P_3O_{10}$. The test results are given in Table 3.

TABLE 3

| No. | Phosphorus Compound | Amount of Added Water Treating Agent (g) | Residual $PO_4^{3-}$ (ppm) | $PO_4^{3-}$ Removability (%) |
|---|---|---|---|---|
| Example | | | | |
| 10 | $KH_2PO_4$ | 0.10 | 0.6 | 98.8 |
| 11 | $NaH_2PO_4$ | 0.10 | 0.7 | 98.6 |
| 12 | $(NaPO_3)_6$ | 0.10 | 2.3 | 95.4 |

EXAMPLES 13 TO 20

The same procedure as in Example 6 was repeated except that the following halides shown in Table 4 were used as additives in an amount of 0.02 g together with 0.08g of the water treating agent of Example 6. The test results are shown in Table 4.

TABLE 4

| | Additive | | Amount of Added Water Treating Agent (g) | Residual $PO_4^{3-}$ (ppm) | $PO_4^{3-}$ Removability (%) |
|---|---|---|---|---|---|
| No. | Halide | Added Amount (g) as Anhydride | | | |
| Example | | | | | |
| 13 | NaF | 0.02 | 0.08 | 3.0 | 94.0 |
| 14 | NaCl | 0.02 | 0.08 | 2.2 | 95.6 |
| 15 | KCl | 0.02 | 0.08 | 1.6 | 96.8 |
| 16 | CaCl | 0.02 | 0.08 | 1.0 | 98.0 |
| 17 | BaCl | 0.02 | 0.08 | 1.3 | 97.4 |
| 18 | KBr | 0.02 | 0.08 | 3.1 | 93.8 |
| 19 | CaBr | 0.02 | 0.08 | 2.6 | 94.8 |
| 20 | CaI | 0.02 | 0.08 | 2.7 | 94.6 |

EXAMPLES 21 TO 24

The same procedure as in Example 5 was repeated except that 0.03 g of the water treating agent added and the concentration of $PO_4^{3-}$ in the agueous sodium tripolyphosphate solution (i.e. 50 ppm as $PO_4^{3-}$) were changed as shown in Table 5 below. The test results are given in the same table.

TABLE 5

| No. | Amount of Added Water Treating Agent (g) | Initial Concentration of Phosphate (ppm)* | Residual $PO_4^{3-}$ (ppm) | $PO_4^{3-}$ Removability (%) |
|---|---|---|---|---|
| Example | | | | |
| 21 | 0.002 | 3.0 | 0.78 | 74.0 |
| 22 | 0.006 | 3.0 | 0.12 | 96.0 |
| 23 | 0.006 | 10.0 | 2.40 | 76.0 |
| 24 | 0.020 | 10.0 | 0.30 | 97.0 |

*calculated as $PO_4^{3-}$

COMPARATIVE EXAMPLES 3 TO 5

The phosphate removability test was conducted in the same way as in Example 1 except for using activated carbon (commercially available as "Shirasagi Ⓐ" by Takeda Chemical Ind., Ltd.) in an amount of 0.03 g (Comparative Example 3), 0.10 g (Comparative Example 4) and 0.30 g (Comparative Example 5) in place of the calcium silicate water-treating agent. The results are given in Table 6.

TABLE 6

| No. | Amount of Added Activated Carbon (g) | Residual $PO_4^{3-}$ (ppm) | $PO_4^{3-}$ Removability (%) |
|---|---|---|---|
| Comparative Example | | | |
| 3 | 0.03 | 43.5 | 13.0 |
| 4 | 0.10 | 42.7 | 14.6 |
| 5 | 0.30 | 40.4 | 19.2 |

EXAMPLE 25

0.500 g of the calcium silicate water-treating agent prepared in Example 5 was added to 500 ml of the aqueous sodium tripolyphosphate solution (concentration calculated as $PO_4^{3-}$: 50 ppm), was stirred at 300 rpm with a magnetic stirrer at room temperature for 90 minutes. This aqueous solution was placed in a 500 ml measuring cylinder and, after allowing it to stand for predetermined periods (30 minutes, 60 minutes, 90 minutes, 120 minutes, 180 minutes and 240 minutes), was drawn from the position of one-fifth from the top surface of the solution using a syringe, without disturbing its turbidity. Turbidity was measured for each of the thus drawn solution samples using a kaoline standard solution and an absorption cell of 10 mm with a spectrophotometer (Model 220A manufactured by Hitachi, Ltd. ) in accordance to the transmission turbidimetric titration specified in subsection 9.2 of JIS K0102 "Testing Methods for Industrial Wastewater" and the results is given in Table 7.

COMPARATIVE EXAMPLE 6

The same precipitation test as in Example 25 was repeated except that quick lime (obtained from Ishizu Pharmaceutical Co. Ltd.) which was previously passed through a 149 μm standard sieve, was used in an amount of 0.500 g in place of the calcium silicate water-treating agent. The test results is given in Table 7.

TABLE 7

| | Turbidity | | | | | |
|---|---|---|---|---|---|---|
| No. | 30 mins. | 60 mins. | 90 mins. | 120 mins. | 180 mins. | 240 mins. |
| Example 25 | 60 | 32 | 25 | 21 | 16 | 11 |
| Comparative Example 6 | 71 | 48 | 43 | 38 | 28 | 20 |

Further, hydrated water-treating agents were prepared in the following Examples and were examined, for their removability.

EXAMPLE 26

162 parts by weight of calcium carbonate powder (CaO content: 54.5%) and 32.6 parts by weight of silica sand powder ($SiCO_2$ content: 96.0%) were weighed, thoroughly mixed and then burned in an electric furnace at 1500° C. for one hour to give a burned product. The burned product thus obtained was finely ground by using a test mill so as to pass through a 149 μm standard sieve.

100 parts by weight of the calcium silicate-based compound thus formed was added to 500 ml of city water and then was hydrated at 20° C. over seven days. After filtering, the resulted solid containing water was dried in a drier at 100° C. over 8 hours and was finely ground until the solid entirely passed through a 149 μm standard sieve to give a water treating agent.

Thereafter, sodium tripolyphosphate (first-grade reagent by Wako Pure Chemical Industries, Ltd.) was dissolved in distilled water to prepare an aqueous solution containing phosphate at a concentration of 40 ppm as $PO_4^{3-}$.

0.05 g of the water treating agent set forth above was added to 100 ml of this aqueous phosphate solution, stirred at 300 rpm with a magnetic stirrer at 20° C. for 90 minutes, and filtered through a filter paper.

In order to examine the $PO_4^{3-}$ removability of this agent, the concentration of $PO_4^{3-}$ remained in the filtrate was measured by the same method as previously described in Example 1. The obtained result is shown in Table 8.

EXAMPLES 27 TO 29 AND COMPARATIVE EXAMPLES 7 AND 8

Further calcium silicate-based compounds were obtained by the same burning and dividing operations as in Example 26 except that the mixing ratio of calcium carbonate powder to silica sand powder was varied as shown in Table 8 below and the further steps of hydration, filtering, heating and grinding were carried out in the same manner as in Example 26. The water treating agents thus obtained were examined in the same phosphate removability test as in Example 26 and the results are given in Table 8 together with the mixing ratio of calcium carbonate powder to silica sand powder.

TABLE 8

| No. | Mixing Ratio of Calcium Carbonate Powder/ Silica Sand Powder (by Weight) | Molar Ratio of CaO to $SiO_2$ of Burned Product | Residual $PO_4^{3-}$* (ppm) | $PO_4^{3-}$ Removability (%) |
|---|---|---|---|---|
| Example | | | | |
| 26 | 162/32.6 | 3.0 | 6.2 | 84.5 |
| 27 | 162/65.2 | 1.5 | 11.2 | 72.0 |
| 28 | 162/48.9 | 2.0 | 9.9 | 75.2 |
| 29 | 162/24.5 | 4.0 | 10.6 | 73.4 |
| Comparative Example | | | | |
| 7 | 162/97.8 | 1.0 | 31.0 | 22.5 |
| 8 | 162/16.5 | 6.0 | 24.9 | 37.8 |

*Amount of added water treating agent: 0.05 w/v %
Initial concentration of $PO_4^{3-}$: 40 ppm

EXAMPLE 30

648 parts by weight of calcium carbonate powder (CaO content: 55.0%), 80 parts by weight of silica sand powder ($SiO_2$ content:96%) and 88 parts by weight of fly ash containing, by weight, 55% $SiO_2$, 33% $Al_2O_3$, 4% $Fe_2O_3$ and 2% CaO were weighed and thoroughly mixed, and then burned in an electric furnace at 1500° C. for one hour. The burned product thus obtained was finely ground to a powder by using a test mill so as to pass through a 149 μm standard sieve.

The resulted calcium silicate-based compound was further porcessed as in Example 26 to give water treating agents and were subjected to the same phosphate removability test as in Example 26. The test data and the pH of the filtrate were given in Table 9.

EXAMPLES 31 AND 32 AND COMPARATIVE EXAMPLE 9

The burned calcium silicate-based compound prepared in Example 30 were hydrated at 20° C. over a period of seven days and then filtered. The resulting water-containing solid matter was further treated as in Example 30 except that it was heated in an electric heater at 300° C. for 4 hours (Example 31); at 600° C. for 3 hours (Example 32) or at 800° C. for 2 hours (Comparative Example 9) and three kinds of water-treating agents were prepared. Then, the same phosphate removability test was conducted in the same way as in Example 26 and the test results are listed in Table 9 below.

EXAMPLE 33

A further water treating agent was prepared in the same procedures as in Example 30 except that hydration was carried out in a hot water conditioned at 65±1° C. over a period of 8 hours. The resulted agent was subjected to the same phosphate removability test as in Example 30 and the result is given in Table 9.

EXAMPLE 34

500 g of the calcium silicate base compound of Example 30 and 500 ml of city water were placed in a 5 liter porcelain pot mill containing porcelain balls with a size of 20 mm and was hydrated at 20° C. for 24 hours while stirring at 70 rpm. After hydration, the product was filtered using a Buechner funnel and the filtered solid containing water was heated and finely ground as in Example 26.

Then, the phosphate removability of the ground agent was examined in the same manner as in Example 26 and the test result is shown in Table 9.

EXAMPLE 35

A water-treating agent was prepared as in Example 30 except that hydration was carried out at 20° C. for a period of 24 hours and the same phosphate removability test as in Example 26 was conducted. The test result is given in Table 9.

EXAMPLES 36 AND 37

Further phosphate removability tests were carried out using 0.10 g (Example 36) and 0.30 g (Example 37) of the water treating agent obtained in Example 30 in the same way as described in Example 26 and the test data is shown in Table 9.

TABLE 9

| No. | Amount of Added Water Treating Agent (g) | Residual $PO_4^{3-}$* (ppm) | $PO_4^{3-}$ Removability (%) | pH of Filtrate | Heating Temp., Time |
|---|---|---|---|---|---|
| Example | | | | | |
| 30 | 0.05 | 5.5 | 86.2 | 11.1 | 100° C., 8 hrs. |
| 31 | 0.05 | 4.6 | 88.4 | 11.3 | 300° C., 4 hrs. |
| 32 | 0.05 | 4.1 | 89.8 | 11.3 | 600° C., 3 hrs. |
| 33 | 0.05 | 5.0 | 87.8 | 11.2 | 100° C., 8 hrs. |
| 34 | 0.05 | 5.4 | 86.5 | 11.1 | 100° C., 8 hrs. |
| 35 | 0.05 | 5.8 | 85.6 | 11.1 | 100° C., 8 hrs. |
| 36 | 0.10 | 0.6 | 98.5 | 11.2 | 100° C., 8 hrs. |
| 37 | 0.30 | 0.3 | 99.2 | 11.7 | 100° C., 8 hrs. |
| Comparative Example | 0.05 | 26.4 | 34.0 | 11.2 | 800° C., 2 hrs. |

TABLE 9-continued

| No. | Amount of Added Water Treating Agent (g) | Residual $PO_4^{3-}$* (ppm) | $PO_4^{3-}$ Removability (%) | pH of Filtrate | Heating Temp., Time |
|---|---|---|---|---|---|
| 9 | | | | | |

*Initial concentration of $PO_4^{3-}$: 40 ppm

EXAMPLES 38 TO 41

Further test was conducted in the same way as in Example 30 except for using sodium primary phosphate (Example 38), potassium primary phosphate (Example 39) and sodium hexametaphosphate (Example 40); and orthophosphoric acid (Example 41) were used in place of sodium tripolyphosphate, The test results are given in Table 10.

TABLE 10

| No. | Phosphorus Compound | Amount of Added Water Treating Agent (g) | Residual $PO_4^{3-}$* (ppm) | $PO_4^{3-}$ Removability (%) |
|---|---|---|---|---|
| Example | | | | |
| 38 | sodium primary phosphate (Na H$_2$PO$_4$) | 0.05 | 5.4 | 86.5 |
| 39 | potassium primary phosphate (K H$_2$PO$_4$) | 0.05 | 5.6 | 86.0 |
| 40 | sodium hexametaphosphate (NaPO$_3$)$_6$ | 0.05 | 6.7 | 83.2 |
| 41 | orthophosphric acid (H$_3$PO$_4$) | 0.05 | 5.0 | 87.5 |

*Initial concentration of $PO_4^{3-}$: 40 ppm

COMPARATIVE EXAMPLES 10 TO 12

The phosphate removability test was conducted in the same way as in Example 26 except for using activated carbon (commercially available as "Shirasagi" by Takeda Chemical Ind., Ltd.) in the amount of 0.05 g (Comparative Example 10), 0.30 g (Comparative Example 11) and 0.50 g (Comparative Example 12) in place of the water-treating agent of Example 26. The results are given in Table 11.

TABLE 11

| No. | Amount of Added Activated Carbon (g) | Initial Concentration of $PO_4^{3-}$ (ppm) | Residual $PO_4^{3-}$ (ppm) | $PO_4^{3-}$ Removability (%) |
|---|---|---|---|---|
| Comparative Example | | | | |
| 10 | 0.05 | 40 | 27.6 | 31.0 |
| 11 | 0.30 | 40 | 25.8 | 35.5 |
| 12 | 0.50 | 40 | 25.2 | 37.0 |

EXAMPLE 42

Sodium humate (first-class reagent by Ishizu Pharmaceutical Co. Ltd.) was dissolved in distilled water to prepare an aqueous sodium humate solution (COD: 99.6 ppm). 0.10 g of the ground water treating agent prepared in Example 26 was added to 200 ml of this aqueous solution, stirred at 300 rpm with a magnetic stirrer at 20° C. for 90 minutes, and the resulting solid matter was filtered through a filter paper.

In order to examine the removability of the water treating agent for COD components, COD (Chemical Oxygen Demand) was measured for the filtrate following the method for measuring COD by using potassium permanganese described in subsection 17 of JIS K 0102 "Testing Methods for Industrial Wastewater" and the result is given in Table 12. In this table, "COD removability" means the percentage of the COD removed by water treating with the agent to the initial COD of the aqueous sodium humate solution.

EXAMPLE 43

The COD removability test described in Example 42 was repeated using the water treating agent of Example 30 and the result is given in Table 12.

EXAMPLE 44

The COD removability test described in Example 42 was repeated using the water treating agent of Example 33 and the result is given in Table 12.

EXAMPLE 45

The COD removability test described in Example 42 was repeated using the water treating agent of Example 35 and the result is given in Table 12.

EXAMPLES 46 TO 48

The COD removability test described in Example 42 was repeated using the hydrated water treating agent of Example 42 except that the COD of the sodium humate solution was changed to 46.0 ppm and the amount of the water treating agent was varied to 0.10 g (Example 46); 0.30 g (Example 47) and 1.00 g (Example 48), respectively, and the test results of this series are given in Table 12.

EXAMPLE 49

The COD removability test described in Example 42 was repeated using the hydrated water treating agent of Example 42 except that the COD of the sodium humate solution was changed to 245 ppm and the amount of the water treating agent was varied to 1.00 g and the test result is given in Table 12.

TABLE 12

| No. | Amount of Added Water Treating Agent (w/v %) | COD (ppm) Initial | COD (ppm) After Treatment | COD Removability (%) |
|---|---|---|---|---|
| Example | | | | |
| 42 | 0.05 | 99.6 | 19.7 | 80.2 |
| 43 | 0.05 | 99.6 | 11.4 | 88.5 |
| 44 | 0.05 | 99.6 | 15.9 | 84.0 |
| 45 | 0.05 | 99.6 | 18.5 | 81.4 |
| 46 | 0.05 | 46.0 | 8.0 | 82.6 |
| 47 | 0.15 | 46.0 | 5.0 | 89.1 |
| 48 | 0.50 | 46.0 | 3.0 | 93.5 |
| 49 | 0.50 | 245 | 23.0 | 90.6 |

EXAMPLES 50 AND 51

Tests for phosphate removability and COD removability were conducted in the same procedures as described in Example 30 (for phosphate) and Example 42 (for COD components) using the water treating agent of Example 30 except that sodium tripolyphosphate and sodium humate were dissolved in distilled water to prepare an aqueous solution containing 40 ppm of $PO_4^{3-}$ and 99.6 ppm of COD and the agent was added in amount of 0.10 g (Example 50) and 0.30 g (Example 51) to 200 ml of this aqueous solution. The test results and the pH values of the respective filtrates are given in Table 13.

COMPARATIVE EXAMPLES 13 AND 14

The removability test as to phosphate and COD components were conducted in the same way as described in Example 50 except for using activated carbon (commercially available as "Shirasagi" by Takeda Chemical Ind., Ltd.) in the amount of 0.10 g (Comparative Example 13), 1.00 g (Comparative Example 14) in place of the calcium silicate water-treating agent. The results are given in Table 13 together with pH values.

TABLE 13

| No. | Amount of Added Water Treating Agent (w/v %) | Initial Concentration of $PO_4^{3-}$ (ppm) | Residual $PO_4^{3-}$ (ppm) | $PO_4^{3-}$ Removability (%) |
|---|---|---|---|---|
| Example | | | | |
| 50 | 0.05 | 40 | 5.6 | 86.0 |
| 51 | 0.15 | 40 | 0.8 | 98.0 |
| Comparative Example | | | | |
| 13 | 0.05 | 40 | 33.5 | 16.2 |
| 14 | 0.50 | 40 | 33.1 | 17.2 |

| No. | COD (ppm) Initial | COD (ppm) After Treatment | COD Removability (%) | pH of Filtrate |
|---|---|---|---|---|
| Example | | | | |
| 50 | 99.6 | 33.1 | 66.8 | 11.4 |
| 51 | 99.6 | 12.4 | 87.5 | 12.0 |
| Comparative Example | | | | |
| 13 | 99.6 | 76.0 | 23.7 | 8.3 |
| 14 | 99.6 | 85.0 | 14.6 | 7.8 |

In order to show the advantageous effect of divisional addition, still further examples will be described.

EXAMPLE 52

162 parts by weight of calcium carbonate powder (CaO content: 54.5%) and 32.6 parts by weight of powder ($SiO_2$ content: 96.0%) were weighed, thoroughly mixed and then burned in an electric furnace at 1500° C. for one hour to give a burned product. The burned product thus obtained was finely ground by using a test mill so as to pass through a 149 μm standard sieve.

100 parts by weight of the calcium silicate-based ground product was added to 500 ml of city water and then was hydrated at 20° C. over three days. After filtering, the resulted solid matter containing water was dried in a drier at 100° C. over 8 hours and was finely ground until the solid entirely passed through a 149 μm standard sieve to give a calcium silicate water treating agent.

The phosphate removability of the treating agent thus obtained was examined in an industrial water containing a phosphorus type rust-preventive agent (commercially available as "Kuriset S-370" from Kurita Water Industries Ltd.). The concentration of phosphate in the industrial water was 11.0 mg/l, calculated as $P_2O_5$.

0.30 g of the above calcium silicate water-treating agent was added to 2000 ml of this industrial water, stirred at 300 rpm with a magnetic stirrer at 20° C. for 60 minutes. Subsequently, the same procedure was repeated using 0.30 g of the same water treating agent and the resulting solid was filtered through a filter paper.

In order to examine the phosphorus removability of this agent, the concentration of $P_2O_5$ in the filtrate was measured in accordance to the method described in Example 1. The obtained result is shown in Table 14.

EXAMPLES 53 TO 55 AND COMPARATIVE EXAMPLES 15 AND 16

Further calcium silicate-based compounds were obtained by the same burning and grinding operations as in Example 52 except that the mixing ratio of calcium carbonate powder to silica sand powder was varied as shown in Table 14 below and the further steps of hydration, filtering, heating and grinding were carried out in the same manner as in Example 52. The water treating agents thus obtained were examined in the same phosphate removability test as in Example 52 and the results are given in Table 14 together with the mixing ratio of calcium carbonate powder to silica sand powder.

TABLE 14

| No. | Mixing Ratio of Calcium Carbonate Powder/ Silica Sand Powder (by Weight) | Molar Ratio of CaO to $SiO_2$ of Burned Product | Residual $P_2O_5$* (mg/l) | $P_2O_5$ Removability (%) |
|---|---|---|---|---|
| Example | | | | |
| 52 | 162/32.6 | 3.0 | 1.1 | 90.0 |
| 53 | 162/65.2 | 1.5 | 2.1 | 80.9 |
| 54 | 162/48.9 | 2.0 | 1.8 | 83.6 |
| 55 | 162/24.5 | 4.0 | 2.2 | 80.0 |
| Comparative Example | | | | |
| 15 | 162/97.8 | 1.0 | 7.2 | 34.5 |
| 16 | 162/16.5 | 6.0 | 6.2 | 43.6 |

*Amount of added water treating agent: 0.015 w/v % (first addition) + 0.015 w/v % (second addition) = 0.030 w/v %
Initial concentration of $P_2O_5$ before treatment: 11.0 mg/l

EXAMPLE 56

324 parts by weight of calcium carbonate powder (CaO content: 55.0%), 40 parts by weight of fly ash containing, by weight, 55% $SiO_2$, 33% $Al_2O_3$, 4% $Fe_2O_3$ and 2% CaO were weighed, thoroughly mixed, and then burned in an electric furnace at 1500° C. for one hour. The burned product thus obtained was finely ground to a powder by using a test mill so as to pass through a 149 μm standard sieve.

The resulted calcium silicate-based compound was further subjected to the same operations of hydration, filtering, heating and grinding as in Example 52 to give hydrated water treating agents and were subjected to the same phosphate removability test as in Example 52. The test data and the pH of the filtrate were given in Table 15.

COMPARATIVE EXAMPLE 17

The same procedure as in Example 56 was repeated except that 0.6 g of the calcium silicate water-treating agent prepared in Example 56 was added at a time and was stirred for a period of 120 minutes. The test result was given in Table 15.

EXAMPLES 57 AND 58

The same procedure as in Example 56 was repeated except that the water treating agent was aged by heating at 300° C. for 4 hours (Example 57) and at 600° C. for 3 hours (Example 58), respectively, in place of the heating at 100° C. for 8 hours and the results are given in Table 15.

EXAMPLE 59

A further water treating agent was prepared in the same procedures as in Example 56 except that hydration was carried out in a hot water conditioned at 65±1° C. over a period of 7 hours. The resulted agent was subjected to the same phosphate removability test as in Example 52 and the result is given in Table 15.

TABLE 15

| No. | Added Amount (w/v %) 1st Addition 2nd Addition Total Amount | Residual $P_2O_5$ (mg/l) | $P_2O_5$ Removability (%) | pH of Filtrate | Heating Temp., Time |
|---|---|---|---|---|---|
| Example |  |  |  |  |  |
| 56 | 0.015 0.015 0.030 | 0.7 | 93.6 | 11.0 | 100° C. 8 hrs. |
| 57 | 0.015 0.015 0.030 | 0.7 | 93.6 | 11.2 | 300° C. 4 hrs. |
| 58 | 0.015 0.015 0.030 | 0.6 | 94.5 | 11.2 | 600° C. 3 hrs. |
| 59 | 0.015 0.015 0.030 | 0.9 | 91.8 | 11.0 | 100° C. 8 hrs. |
| Comparative Example 17 | 0.030 | 2.3 | 79.0 | 11.4 | 100° C. 8 hrs. |

EXAMPLE 60

The industrial water containing the phosphorus rust-preventive agent previously described in Example 52 was fed continuously at a rate of 60 liters per hour to a water treating system in which four reaction vessels with a diameter of 30 cm, a height of 43 cm and an effective volume of 25 liters each having a stirrer were arranged in series. The calcium silicate water-treating agent prepared in Example 56 was fed at a rate of 1.8 g/hr. to the first vessel and to the third vessel to treat the above phosphate-containing industrial water therewith and the treated water discharged from the fourth vessel was continuously filtered. At the time the constant state was established in the filtrate, the concentration of $P_2O_5$ in the filtrate was measured and found to be 0.1 mg/l.

EXAMPLE 61

A wastewater of a fertilizer factory was treated by the same water treatment process and the same system as in Example 60 except that 50 percent, 25 percent and 25 percent of the total amount of the reagent to be added were continuously fed to the first vessel, the second vessel and third vessel, respectively.

In this treatment, the initial concentration as $P_2O_5$ before treatment was 40 mg/l and the total amount of the calcium silicate water-treating agent added was 30 g/h. The concentration of $P_2O_5$ in the filtrate at the time the constant state was reached in the last vessel was 0.2 mg/l.

COMPARATIVE EXAMPLE 18

The industrial water used in Example 60 was treated in the same way except that the total amount of the calcium silicate water-treating agent was fed into the first vessel.

The concentration of $P_2O_5$ in the filtrate at the constant state was 1.5 mg/l.

As previously set forth in detail, the calcium silicate water treating agents of the present invention exhibit an unexpectedly considerable removing ability for the pollutants contained in waste water, especially phosphorus compounds, such as orthophosphoric acid, pyrophosphoric acid, metaphosphoric acid or phosphates thereof or tripolyphosphate, and COD components which can not be easily removed by any of conventional adsorption methods using activated carbon or other known adsorbents or activated sludge process, etc. Further, the sludge resulted from the water treatment can be readily precipitated and dewatered. Further, since the amount of sludge formed during the treatment process is reduced compared to any conventional treatment technique, it can be after-treated easily by a simple process, such as incineration or other appropriate treatments, thereby reducing the treatment time, labor and cost. It has also been found that when the invention water-treating agent is divided into parts, preferably two to four parts, and each part is separately added to water, the treatment efficiency can be further increased. Further, the water treating agents are easy to handle and to store as compared to well-known adsorbents, for example, quick lime.

What is claimed is:

1. A process for teating waste water containing phosphorus compounds and/or organic oxidizable pollutants, which consists essentially of: contacting said waste water with particles of a calcium silicate treating agent consisting of a burned product which has been prepared by burning, at a temperature of from 1300° to 1600° C., a mixture consisting of a calcium compound which is thermally decomposed to form CaO at said temperature and a $SiO_2$-containing compound, the molar ratio of $CaO/SiO_2$ in said burned product being in the range of from 1.5 to 5.0; adsorbing said phosphorus compounds and/or said pollutants on the surfaces of the particles of said treating agent; and then separating from the water, said treating agent together with the phosphorus compounds and/or pollutants that are adsorbed thereon.

2. A process as claimed in claim 1 in which said treating agent consists essentially of $Ca_3SiO_5$ and $Ca_2SiO_4$.

3. A process as claimed in claim 1 in which said treating agent is mixed with said waste water and the amount of said treating agent added to said waste water is sufficient to raise the pH of said waste water to 10.3 or higher.

4. A process as claimed in claim 1 in which said molar ratio of $CaO/SiO_2$ is in the range of from 2.0 to 4.0.

5. A process as claimed in claim 1 in which the total amount of said treating agent that is added to said waste water is divided into from two to four separate parts, and which comprises separately adding each of said parts to said waste water at spaced time intervals.

6. A process as claimed in claim 1 in which the ratio of the total amount of said treating agent that is added to said waste water to the amount of the phosphorus compounds, calculated as $PO_4^{3-}$, in the waste water is from 6/1 to 60/1.

7. A process for treating waste water containing phosphorus compounds and/or organic oxidizable pollutants, which comprises; contacting said waste water with particles of a calcium silicate treating agent and an auxiliary treating agent selected from the group consisting of water-soluble alkali metal halides and water-soluble alkaline earth metal halides, said calcium silicate treating agent consisting of a burned product which has been prepared by burning, at a temperature of from 1300° to 1600° C., a mixture of a calcium compound which is thermally decomposed to form CaO at said temperature, and a $SiO_2$ containing compound, the molar ratio of $CaO/SiO_2$ in said burned product being in the range of from 1.5 to 5.0; adsorbing said phosphorus compounds and/or said pollutants on the surfaces of the particles of said calcium silicate treating agent; and then separating from the water, said calcium silicate treating agents together with the phosphorus compounds and/or pollutants that are adsorbed thereon.

8. A process as claimed in claim 7, in which said calcium silicate treating agent consists essentially of $Ca_3SiO_5$ and $Ca_2SiO_4$.

9. A process as claimed in claim 7 in which said treating agents are mixed with said waste water and the amount of said calcium silicate treating agent that is added to said waste water is sufficient to raise the pH of said waste water to 10.3 or higher.

10. A process as claimed in claim 7 in which said molar ratio of $CaO/SiO_2$ is said calcium silicate treating agent is in the range of from 2.0 to 4.0.

11. A process as claimed in claim 7 in which the total amount of said calcium silicate treating agent that is added to said waste water is divided into from two to four separate parts, and which comprises separately adding each of said parts to said waste water at spaced time intervals.

12. A process as claimed in claim 7 in which the ratio of the total amount of said calcium silicate treating agent that is added to said waste water to the amount of the phosphorus compounds, calculated as $PO_4^{3-}$, in the waste water is from 6/1 to 60/1.

13. A process as claimed in claim 7 in which the process consists of contacting said waste water with only said calcium silicate treating agent and said auxiliary treating agent.

14. A process as claimed in claim 7 in which said auxiliary treating agent is at least one compound selected from the group consisting of potassium flouride, sodium flouride, photasium chloride, sodium chloride, magnesium chloride, calcium chloride, barium chloride, potassium bromide, sodium bromide, calcium bromide, barium bromide and calcium iodide.

15. A process for treating waste water containing phosphorus compounds and/or organic oxidizable pollutants, which comprises; contacting said waste water with a hydrated calcium silicate treating agent which has been prepared by burning, at a temperature of from 1300° to 1600° C., a mixture comprising a calcium compound which is thermally decomposed to form CaO at said temperature and a $SiO_2$-containing compound, the molar ratio of $CaO/SiO_2$ in said burned product being in the range of from 1.5 to 5.0, then hydrating said burned product to increase the specific surface area thereof and then aging said hydrated product by heating the hydrated product at a temperature of 50° to 700° C.; adsorbing said phosphorus compounds and/or said pollutants on said treating agent; and then separating from the water, said treating agent together with the adsorbed phosphorus compounds and/or pollutants.

16. A process as claimed in claim 15 in which said treating agent consists essentially of $CaSiO_5$ and $Ca_2SiO_4$.

17. A process as claimed in claim 15 in which the burned product also contains $Al_2O_3$ and/or $Fe_2O_3$.

18. A process as claimed in claim 15 in which said treating agent is mixed with said waste water and the amount of said treating agent that is added to said waste water is sufficient to raise the pH of said waste water to 10.3 or higher.

19. A process as claimed in claim 15 in which said molar ratio of $CaO/SiO_2$ is in the range of from 2.0 to 4.0.

20. A process as claimed in claim 15 in which the total amount of said treating agent that is added to said waste water is divided into from two to four separate parts, each of said parts is separately added to said waste water at spaced time intervals.

21. A process as claimed in claim 15 in which the ratio of the total amount of said treating agent that is added to said waste water to the amount of the phosphorus compounds, calculated as $PO_4^{3-}$, in the waste water is from 12.5/1 to 75/1.

22. A process as claimed in claim 15 in which at least one auxiliary agent selected from the group consisting of water-soluble alkali metal halides and water-soluble alkaline earth metal halides is added together with said hydrated calcium silicate treating agent.

23. The process as claimed in claim 15 in which at least one auxiliary agent selected from the group consisting of potassium fluoride, sodium fluoride, potassium chloride, sodium chloride, magnesium chloride, calcium chloride, barium chloride, potassium bromide, sodium bromide, calcium bromide, barium bromide and calcium iodide is added together with said hydrated calcium silicate treating agent.

24. A process as claimed in claim 15 in which said burned product is hydrated by immersing said burned product in hydration water at from 15° to 70° for at least 30 minutes, wherein the amount of said hydration water is from 1 to 7 times the weight of said burned product, then separating the hydrated product from said hydration water and then aging said hydrated product.

25. A process as claimed in claim 15 in which the ratio of the total amount of said treating agent that is added to said waste water to the amount of said organic oxidizable pollutants, based on the COD value thereof measured using potassium permanganate is from 5 to 110.

* * * * *